March 2, 1965 A. CLEMENTS 3,171,525
RETRACTABLE HOUSING ASSEMBLY FOR CLUTCHES AND THE LIKE
Filed July 11, 1962 5 Sheets-Sheet 1

INVENTOR.
Albert Clements
BY
ATTORNEYS

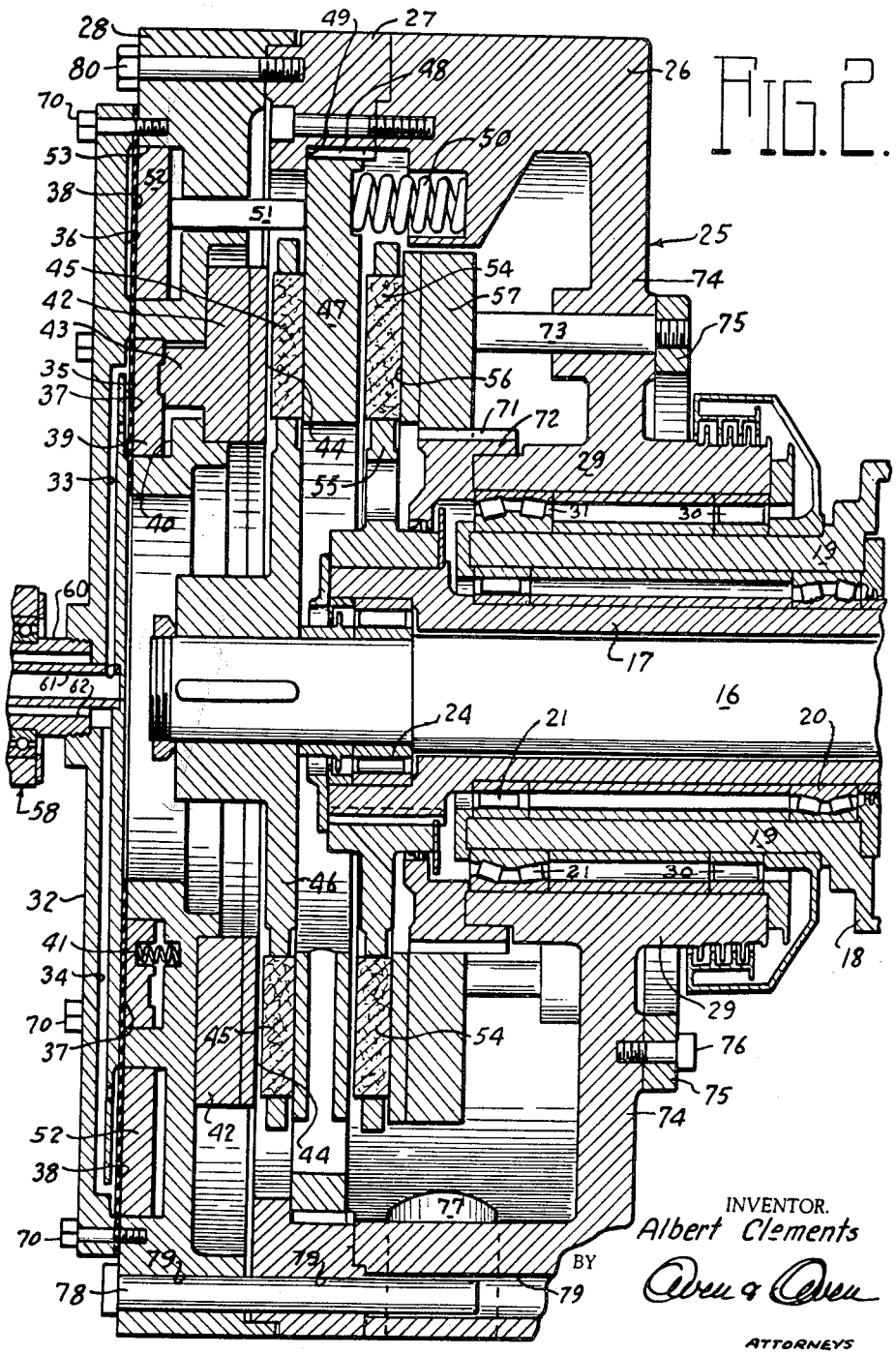

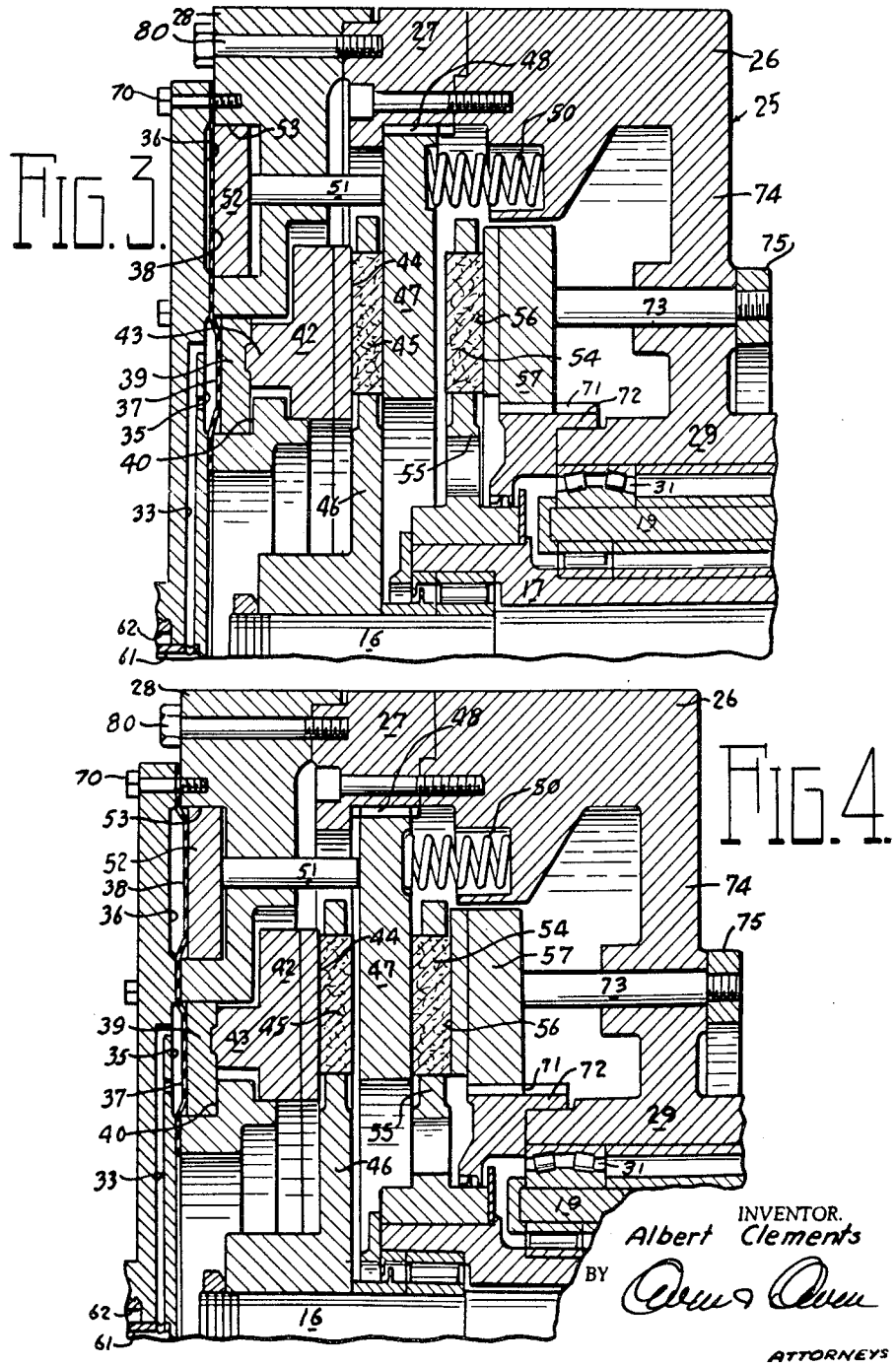

INVENTOR.
Albert Clements

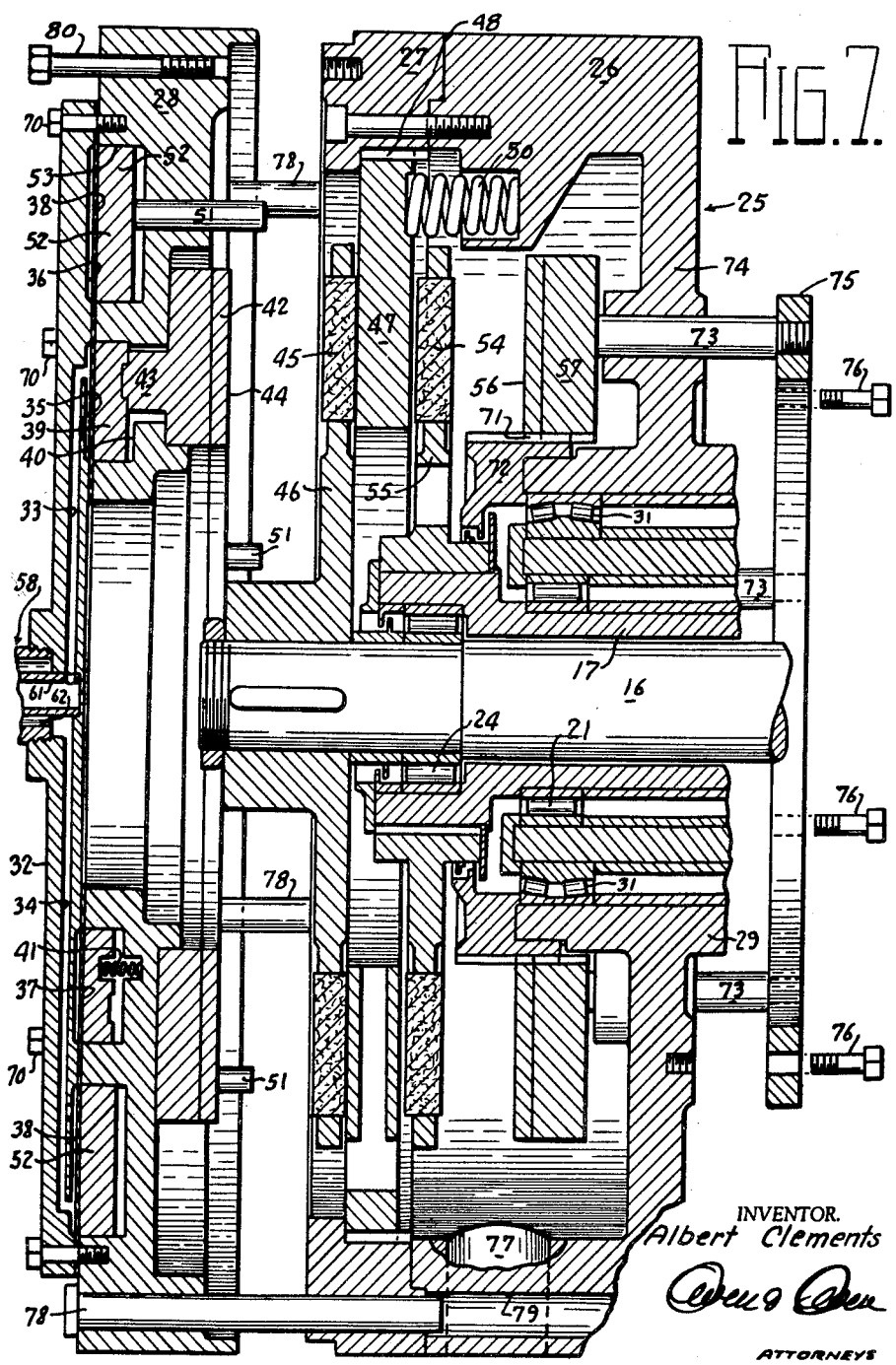

United States Patent Office 3,171,525
Patented Mar. 2, 1965

3,171,525
RETRACTABLE HOUSING ASSEMBLY FOR
CLUTCHES AND THE LIKE
Albert Clements, Hamilton, Ohio, assignor to Baldwin-Lima-Hamilton Corporation, Philadelphia, Pa., a corporation of Pennsylvania
Filed July 11, 1962, Ser. No. 209,815
1 Claim. (Cl. 192—110)

This invention pertains to a two-speed drive mechanism and more particularly to a drive incorporating two fluid or pneumatically operated clutches in which power is transmitted through members which are operatively engaged with other members by being moved in the same direction.

Two-speed drives are widely used with large power presses. During an initial portion of a power stroke of a press, a fast speed is preferred to move an upper die quickly down nearly to the point of closure against a lower die. A slow speed is then used during a metal forming portion of the stroke when the dies are closed and a considerable force is required. After the metal forming operation, a fast return stroke is preferred to hasten completion of the cycle.

In this type of operation, fast advance, slow draw or form, and fast return, more productive strokes per minute can be had without increasing the working speed of the press. The working speed of the press is limited by the capacity of the material to be drawn or deformed without tearing.

To achieve this type of power stroke, two separate clutches are commonly employed which are engaged by air cylinders, solenoids, or other actuating means. Because of wear or misalignment, for example of the actuating means, synchronism of the engagement of the clutches is destroyed and the operation of the clutches either overlaps or is spaced so that there is a time lag therebetween. In the former case, one of the clutches must slip, causing that clutch face to heat up and wear excessively. In the latter case, the machinery being driven slows down or even stops during the time lag and the second clutch must then engage and drive the slowly moving, or stationary parts which causes slippage and rapid wear and heating on the clutch faces during the initial portion of the engagement.

Two-speed drives have numerous other applications in which these and similar problems arise.

According to one important feature of the invention the parts are arranged to enable easy access to the clutch members for maintenance or inspection without requiring dismantling of the clutches. The fluid conduits, diaphragms, and packing are also easily accessible with the new drive of the present invention.

A further object is to provide a drive in which all wearing parts are easily accessible for replacement or inspection.

Other objects of the invention will be apparent from the following detailed description of a particular embodiment thereof, reference being made to the accompanying drawings, in which:

FIGURE 2 is a cross-sectional view taken on the line 2—2 of FIGURE 1;

FIGURE 3 is a fragmentary cross-sectional view of the drive of FIGURE 2 showing a clutch therein in operative engagement;

FIGURE 4 is a fragmentary cross-sectional view similar to FIGURE 3 but showing another clutch therein in operative engagement;

FIGURE 7 is a cross-sectional view similar to FIGURE 2 but showing portions thereof displaced to enable easy access for the replacement of wearing parts.

Figure 1:
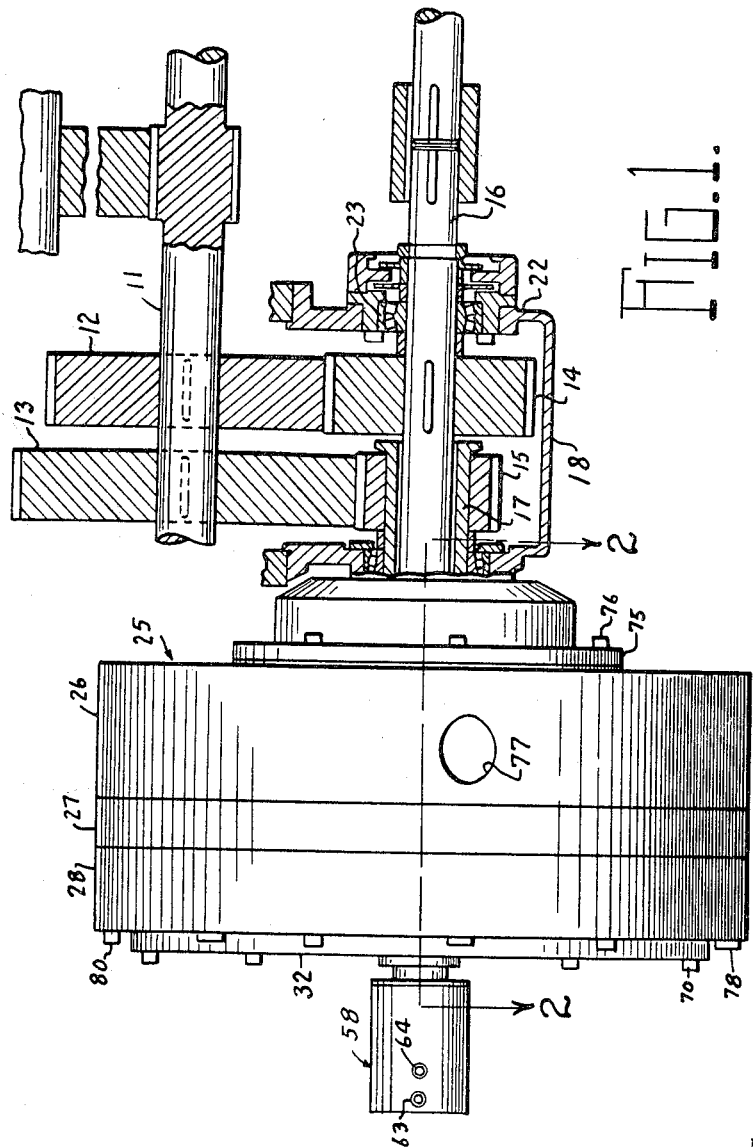
FIGURE 1 is a side view, partially in cross-section, of a gear train and a drive embodying the invention.

A specific embodiment of the invention is shown in FIGS. 1 and 2. A shaft 11 (FIG. 1) drives a power press or other apparatus through appropriate gears or other mechanism. The shaft 11 is connected to a high speed gear 12 and a low speed gear 13 which are respectively operatively engaged with high speed and low speed pinions 14 and 15. The pinion 14 is affixed to a shaft 16, only a portion of which is shown. The other end of this shaft may be free or connected to a brake or another gear. The pinion 15 is connected to an annular shaft 17 which is concentrically located about the shaft 16. The shafts 16 and 17 are supported by an appropriate support bracket 18, with the shaft 17 supported in a tubular portion 19 (FIG. 2) of the bracket 18 by suitable anti-friction bearings 20 and 21 while the shaft 16 is supported in an outer flanged portion 22 (FIG. 1) of the bracket 18 and in the shaft 17 by bearings 23 and 24.

A drive housing 25 may be provided with suitable grooves for V-belts or with other means by which the housing 25 can be driven by a drive motor (not shown). The housing 25 comprises inner, center and outer sections 26, 27 and 28. The section 28 is separable from the section 27 to provide easy access to the interior of the housing 25 as will be more fully discussed subsequently. Sections 26 and 27 are separable principally for easier manufacture. The inner section 26 has a flange 29 concentrically located with respect to the tubular portion 19 of the bracket 18 and is rotatably supported thereby through bearings 30 and 31.

Figure 6:
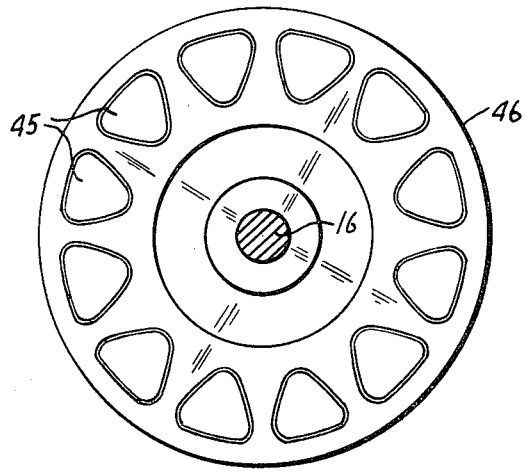
FIGURE 6 is a detailed view of a portion of a clutch spider used with the drive of FIGURES 1–4.

A circular plate 32 is attached to the outer section 28 and carries or contains fluid passages 33 and 34 which communicate with inner and outer annular recesses 35 and 36 and inner and outer annular diaphragms 37 and 38, respectively. An inner, annular piston 39, located in an inner, annular recess 40 in the outer housing section 28, is held outwardly against the inner diaphragm 37 by springs 41, and is moved inwardly against the springs when sufficient pressure is exerted on the diaphragm 37. A forward clutch member or ring 42 is operatively connected to the inner piston 39 through stems 43 and has a wear face 44 which is engageable with friction segments 45 (see also FIG. 6) of a front spider 46 attached to the shaft 16. When the forward clutch ring 42 moves inwardly (see FIG. 3), the segments 45 are clamped in clutching engagement between the wear face 44 of the clutch ring 42 and a slidable, center clutch member or ring 47 which enables a maximum surface of the segments 45 to be contacted. The slidable ring 47 is splined at 48 to the center housing section 27 and is urged to a position against a shoulder 49 of the center section 27 by heavy springs 50. When the clutch ring 42 is moved inwardly by reason of air pressure behind the annular piston 39, a drive is established from the housing through the ring 47 and the forward clutch disk 46 to the shaft 16.

The slidable center ring 47 bears against actuating pins 51 which also engage an outer annular piston 52 in an outer annular recess 53. The piston 52 is moved inwardly when sufficient fluid pressure is applied to the diaphragm through passage 34 to overcome the force of the springs 50. The slidable ring 47 is then moved away from the forward spider 46 (see FIG. 4) and into engagement with friction segments 54 of a second or rear spider 55 connected to the outer concentric shaft 17. The friction segments 54 which may be normally in slight, slidable contact with a wear face 56 of a rear clutch ring 57 are thus moved into clutching engagement with the ring 47 and the wear face 56 and a drive connection is established between the housing 25 and the shaft 17.

The area of the outer diaphragm 38 is preferably larger than that of the inner diaphragm 37 since the force exerted on the diaphragm 38 must be large enough to overcome the force of the heavy springs 50 while the force exerted on the diaphragm 37 must be less than the force of the springs 50. With this design, the shaft 11 can be instantly changed from low speed rotation to high speed rotation even with fluid pressure being constantly applied to the inner diaphragm 37. Thus with pressure on the diaphragm 37, the inner piston 39 is moved to its inner position so that the front spider 46 is engaged between the wear face 44 of the forward clutch ring 42 and the slidable center ring 47. If equal fluid pressure is then applied to the outer diaphragm 38 so that the force created exceeds the force of the heavy springs 50, the slidable center ring 47 is moved inwardly to engage the friction segments 54 of the rear spider 55 and at the same time is moved away from the friction segments 45 of the front spider 46. These segments 45 will then be in only slight, slidable, non-driving contact with the wear face 44 of the forward clutch ring 42. As a safety measure, the movement of the inner piston 39 is limited by the inner recess 40 to prevent any possibility of the forward ring 42 being moved inwardly far enough to engage both spiders 46 and 55. The engagement of the rear spider 55 by the slidable center ring 47 is substantially instantaneous, the time interval between the disengagement of the front spider 46 and the engagement of the rear spider 55 being only the time required for the slidable center ring 47 to move a fraction of an inch to its inner position. No critical timing is necessary.

Figure 5:
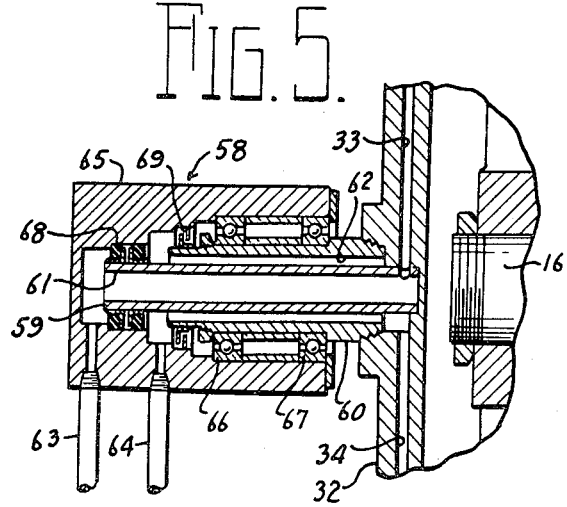
FIGURE 5 is a detailed, cross-sectional view of a fluid coupling or inlet which may be employed with the drive.

The clutch members are preferably fluid operated. Fluid may be supplied to the passages 33 and 34 through a conventional rotatable fluid coupling 58 (see FIG. 5). This coupling consists of two concentric tubes 59 and 60 forming passages 61 and 62 which connect fluid inlets 63 and 64 to the passages 33 and 34. The inlets 63 and 64 are located in a stationary casing 65 which is supported by the outer tube 60 through bearings 66 and 67. The passages 61 and 62 are separated by an appropriate seal 68 and the passage 62 is separated from the bearings 66 and 67 by a seal 69. The inlets 63 and 64 may be connected to piping or tubing in which a suitable valve is located to control the flow of fluid to the inlets.

The concurrent direction of forces applied to the clutch members enables all of the fluid conduits and controls to be at one end of the housing 25 for easy accessibility. Thus, the diaphragms 37 and 38 and the pistons 39 and 52 may be repaired or inspected simply by removing machine screws 70 which attach the circular plate 32 to the outer housing section 28. The coupling 58 provides easy access to the fluid inlets also. In addition, the arrangement further provides maximum compactness and simplicity of the clutch.

In accordance with the principal advantage of the present invention, the friction segments of the two-clutch spiders are easily accessible for replacement or inspection. For the purpose of gaining access to the rear spider 46 the rear clutch ring 57 is splined at 71 to a member 72 attached to the flange 29 of the rear housing section 26. The rear clutch ring 57 is maintained in a fixed position closely adjacent the rear spider by a plurality of pins 73 which constitute holding means for the ring 57. The pins 73 extend through a wall 74 of the rear housing section 26 and are attached to a connecting ring 75 which is a releasing means for releasing the holding means. The connecting ring is, in turn, attached to the wall 74 by a plurality of tap bolts 76 which are unscrewed to release the connecting ring 75 from the wall 74. The ring 75 is then pulled outwardly (see FIG. 7) which enables the rear clutch ring 57 to be moved by a mechanic along the spline 71 and away from the spider 55 which carries the friction segments 54. One or more access openings 77 are provided in the section 26 through which the mechanic can reach and grasp the ring 57 to move it back and expose the segments 54 for removal or inspection. Thus, the segments 54 can be replaced in a matter of minutes since it is only necessary to slip new pieces into the holes in the spider 55 and to reassemble the ring 75 and its fastening bolts.

The segments 45 of the front spider 46 are also easily accessible. For this purpose, a plurality of guide pins 78 are provided which extend partially through holes 79 in the three sections 26, 27 and 28. Tap bolts 80 are removed and the outer section 28 with the plate 32 extended axially outwardly to separate the forward clutch ring 42 from the front spider 46 and the segments 45. This also leaves a gap between the center and outer sections 27 and 28. The segments 45 are thus accessible through the gap and may then be easily inspected or replaced. The guide pins 78 are left in position in a portion of the holes 79 in the center section 27 to serve as means for temporarily aligning and supporting the outer section 28 with the other sections of the clutch.

The operation of the present invention is believed to be clear from the above description of a preferred embodiment thereof. It will be seen that the invention provides a drive mechanism that is easily repaired and in which the wearing friction segments may be replaced in the clutch elements without disassembling the unit as is required in most clutches with which I am familiar.

The foregoing description and drawings have been intended to serve in an illustrative and not a limiting sense, the scope of the invention being determined only by the claim appended hereto.

What I claim is:

A drive mechanism comprising a housing, a shaft extending through said housing, a spider attached to said shaft within said housing, a first clutch ring slidably held by said housing on one side of said spider, a second clutch ring slidably held by said housing on the opposite side of said spider, means for moving said first ring toward said spider to clamp said spider between said rings to provide a driving engagement between said shaft and said housing, said housing having an end wall on the side of said spider toward said second clutch ring and having a plurality of passages therein which are parallel to said shaft and equally spaced therefrom, a plurality of elongate elements slidably held by said passages of said end wall and constrained by said housing for movement only in a direction parallel to said shaft, a releasing ring located outside said housing and spaced radially outwardly from said shaft, said releasing ring having means connecting said ring to all of said elongate elements with said releasing ring and said elements movable as a unit and in a direction only parallel to said shaft, bolt means affixing said releasing ring to said end wall of said housing when said releasing ring is adjacent said end wall, said releasing ring otherwise being spaced from all of said housing, said elongate elements being of sufficient length to abut said second clutch ring when said releasing ring is affixed to said housing, said housing having an access opening through which said second ring can be moved away from said spider when said elongate elements have been separated therefrom by said releasing ring, whereby wearing elements of said spider can be replaced.

References Cited by the Examiner
UNITED STATES PATENTS 2,039,128  4/36  Tiedemann.
2,646,148  7/53  Matrot.
2,759,582  8/56  Dehn.
2,857,031  10/58  Fawick _____ 192—112 XR DAVID J. WILLIAMOWSKY, *Primary Examiner.*

ROBERT C. RIORDON, *Examiner.*